(12) United States Patent
Bernard et al.

(10) Patent No.: US 8,041,094 B2
(45) Date of Patent: Oct. 18, 2011

(54) METHOD FOR THE THREE-DIMENSIONAL VIEWING OF TOMOSYNTHESIS IMAGES IN MAMMOGRAPHY

(75) Inventors: Sylvain Bernard, Montigny le Bretonneux (FR); Bruno Le Corgne, Essone (FR); Razvan Gabriel Iordache, Paris (FR); Serge Louis Wilfrid Muller, Guyancourt (FR)

(73) Assignee: General Electric Company, Schenectady, NY (US)

( * ) Notice: Subject to any disclaimer, the term of this patent is extended or adjusted under 35 U.S.C. 154(b) by 943 days.

(21) Appl. No.: 11/943,058

(22) Filed: Nov. 20, 2007

(65) Prior Publication Data
US 2008/0123930 A1 May 29, 2008

(30) Foreign Application Priority Data
Nov. 24, 2006 (FR) ...................... 06 55103

(51) Int. Cl.
*G06K 9/36* (2006.01)
*A61B 6/03* (2006.01)
(52) U.S. Cl. .......... 382/131; 382/132; 382/173; 378/22; 378/27; 378/37
(58) Field of Classification Search ............... 382/131, 382/132, 173; 378/22, 27, 37
See application file for complete search history.

(56) References Cited

U.S. PATENT DOCUMENTS

| | | | |
|---|---|---|---|
| 5,627,907 A | 5/1997 | Gur et al. | |
| 5,872,828 A * | 2/1999 | Niklason et al. | 378/23 |
| 6,205,236 B1 | 3/2001 | Rogers et al. | |
| 6,249,594 B1 * | 6/2001 | Hibbard | 382/128 |
| 6,577,752 B2 * | 6/2003 | Armato et al. | 382/131 |
| 7,218,766 B2 * | 5/2007 | Eberhard et al. | 382/132 |
| 7,463,713 B2 * | 12/2008 | Mertelmeier | 378/22 |
| 7,512,284 B2 * | 3/2009 | Avinash | 382/266 |
| 7,630,533 B2 * | 12/2009 | Ruth et al. | 382/131 |
| 7,646,902 B2 * | 1/2010 | Chan et al. | 382/128 |
| 7,653,229 B2 * | 1/2010 | Kaufhold et al. | 382/131 |
| 7,693,254 B2 * | 4/2010 | Muller et al. | 378/37 |
| 7,853,064 B2 * | 12/2010 | Bernard et al. | 382/132 |
| 7,903,861 B2 * | 3/2011 | Luo et al. | 382/132 |
| 7,929,743 B2 * | 4/2011 | Khorasani | 382/128 |
| 2005/0135695 A1 | 6/2005 | Bernard et al. | |
| 2007/0052700 A1 | 3/2007 | Wheeler et al. | |
| 2007/0189448 A1 | 8/2007 | Muller et al. | |

OTHER PUBLICATIONS

U.S. Appl. No. 11/756,471, filed May 31, 2007, Sylvain Bernard, et al.
U.S. Appl. No. 11/757,924, filed Jun. 4, 2007, Sylvain Bernard, et al.
U.S. Appl. No. 11/828,451, filed Jul. 26, 2007, Sylvain Bernard, et al.

* cited by examiner

*Primary Examiner* — Allen C. Ho
(74) *Attorney, Agent, or Firm* — Global Patent Operation; Jonathan E. Thomas

(57) ABSTRACT

In a method for the 3D viewing of tomosynthesis images in mammography, an algorithm is proposed for the viewing of radiology signs in series of 3D data. When the digital volume is being viewed by a practitioner, the disclosed algorithm is used to provide a dynamic indication of the position of the radiology signs on the 3D image by means of markers. The use of dynamic viewing draws the practitioner's attention to the zones of clinical interest. The disclosed algorithm thus highlights all the radiology signs in the 3D image of the breast.

16 Claims, 2 Drawing Sheets

METHOD FOR THE THREE-DIMENSIONAL VIEWING OF TOMOSYNTHESIS IMAGES IN MAMMOGRAPHY

FIELD OF THE INVENTION

An object of the present invention is a method for the three-dimensional viewing of tomosynthesis images in mammography. The present invention enables a dynamic display of markers of radiology signs in the digital volume of the breast. The present invention finds particularly advantageous but non-exclusive application in medical imaging and more particularly in mammography. The present invention also relates to a station for the reviewing of medical images comprising a viewing method of this kind.

DESCRIPTION OF THE PRIOR ART

Mammography is now widely used for the detection of lesions and the prevention of breast cancer. There are novel mammography devices in the prior art that produce a 3D image of the patient's breast. Such devices acquire several projections of an object at different angles and then reconstruct the 3D distribution of this object using a mammography reconstruction algorithm.

However, this new tomosynthesis mammography device has drawbacks. In such devices, 50 to 80 slices are rebuilt or reconstructed in the digital volume for the average breast. Hence, the quantity of information to be managed is very great. Similarly, access to information of clinical interest takes much more time because the search for this information is made sequentially, slice-by-slice, in this volume.

Moreover, depending on the space between the slices of the digital volume, the information on the presence of radiology signs is dispersed over several consecutives slices, depending on the size of the radiology signs detected, thus increasing the difficulty of access to information of clinical interest in the 3D image of the patient's breast.

SUMMARY OF THE INVENTION

The invention is aimed precisely at overcoming the drawbacks of the techniques explained here above. To this end, the invention proposes a method for the viewing of the digital volume by which the practitioner can automatically detect radiology signs in series of 3D images. The time spent on locating these radiology signs is greatly reduced. Thus, the system averts a possibility of lesions being missed by the radiologist during his examination. With this method of displaying tomosynthesis images in mammography, the radiology signs are easier to identify, thus enabling a more efficient examination.

The invention proposes a novel approach to mammography that advantageously exploits the techniques of the digital processing of radiology images to improve the readability of information.

This viewing method can be used to cope with large quantities of data in developing novel strategies capable of reducing the time spent in the review of clinical data and of simplifying access to information of clinical interest.

The present invention proposes a digital volume viewing algorithm. The algorithm of the invention is applied in association with any type of existing or future radiology sign detection algorithm. At any position of a radiology sign detected in the digital volume, the algorithm of the invention computes markers thus revealing the positions of the radiology signs in the digital volume, during the 3D viewing of the digital volume by a practitioner.

These markers may be 3D, 2D or 1D markers. For each type of dimension of markers, the invention implements a 3D viewing algorithm.

Should the markers be 2D or 1D markers, the viewing of the digital volume is implemented in continuously displaying the slices of the digital volume on a screen in rapid succession, giving the illusion of motion on the part of the markers.

Should the markers be 3D markers, the viewing of the digital volume is implemented by a 3D viewing algorithm firstly enabling the display of the digital volume on a screen and secondly enabling the practitioner to view it at different viewing angles.

The use of the digital volume viewing algorithm of the invention draws the practitioner's attention to the zones of clinical interest. The algorithm of the invention thus highlights all the radiology signs present in the 3D image of the breast.

More specifically, an object of the invention is a method for viewing mammography tomosynthesis images produced by an X-ray device (1), in which:

several radiography projections of a body are made,
a digital volume of the body in slices is reconstructed,
structures representing radiology signs are localized in this digital volume,
wherein
for each localized radiology sign, a bounding surface, corresponding to a surface demarcating the maximum extent of said radiology sign, is computed,
for each bounding surface, the set of successive slices having a non-null intersection with said bounding surface is determined,
a 2D contour is plotted about each intersection, in the corresponding reconstructed slice,
the 2D contours are viewed by the continuous display, on a screen, of the slices of the digital volume in rapid succession, or
the bounding surfaces are viewed through the application of a 3D viewing algorithm to the digital volume.

The invention also relates to a device for the implementation of said method for the viewing of mammography tomosynthesis images.

BRIEF DESCRIPTION OF THE DRAWINGS

The invention will be understood more clearly from the following description and from the accompanying figures. These figures are given by way of an indication and in no way restrict the scope of the invention.

DETAILED DESCRIPTION OF EMBODIMENTS OF THE INVENTION

Figure 1:
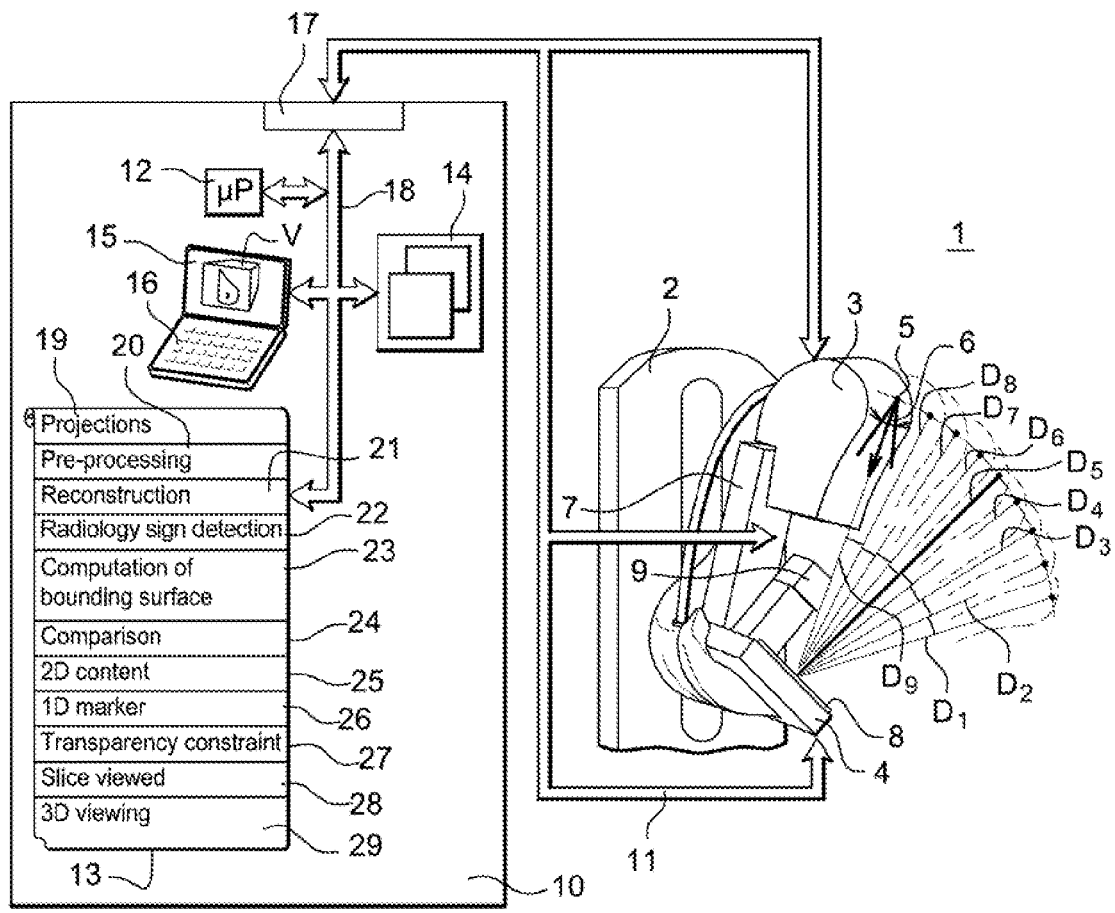
FIG. 1 is a schematic view of an X-ray device, especially a mammography machine, provided with the improved means of the invention.

FIG. 1 shows an X-ray device, especially a mammography machine, according to the invention. This X-ray device 1 has a vertical column 2. On this vertical column, there is a hinged arm 7 bearing an X-ray emitting tube 3 and a detector 4 capable of detecting the X-rays emitted by the tube 3. This arm 7 may be oriented vertically, horizontally or obliquely. The tube 3 is provided with a focus 5 which is the X-ray emitting focus. This focus 5 emits an X-ray beam 6 along the direction of emission D.

The arm 7 is hinged on the vertical column 2 in such a way that it enables the tube 3 to be shifted along a path in the form of a circle arc while at the same time leaving the detector 4 immobile. Other arrangements are possible, enabling the tube to move in a plane or in a sphere portion. The tube 3 can then take up different positions spread in a tilt between two extreme positions. These two positions are, for example, perpendicular to the plane of the detector.

In a preferred example, the detector 4 is a digital detector. The detector 4 is hooked to the arm 7 opposite the tube 3 and in the direction of emission D, so as to receive the X-ray beam 6.

The arm 7 is provided with a breast-holder tray 8 on which a patient lays her breast. This breast-holder tray 8 is placed on top of the detector 4. The detector 4 is placed beneath the breast-holder tray 8. The detector 4 detects the X-rays that have crossed the patient's breast and the breast-holder tray 8.

Furthermore, for reasons related both to the immobilizing of the breast and to image quality or intensity of X-rays delivered to the patient's breast, it is necessary to compress the patient's breast at the time of the radiography. Various compression forces may be applied. These forces are applied through a compression pad 9 which compresses the breast on the breast-holder tray 8 according to the type of examination to be made. To this end, the arm 7 has a pad 9 that is a sliding pad capable of being made to compress the breast either manually or in being motor-driven. The pad 9 is made out of an X-ray transparent material, for example plastic. The arm 7 therefore bears the following vertically: starting from the top, the X-ray tube 3, the compression pad 9, the breast-holder tray 8 and the detector 4.

While the pad 9, the patient's breast, the tray 8 and the detector 4 are fixed, the X-ray tube 3 may take up various positions in space relative to this assembly.

In one variant, the detector 4 may be mobile and may take up various positions around the breast at the same time as the X-ray tube 3. In this case, the detector 4 is no longer fixedly joined to the breast-holder tray 8. The detector 4 may be flat or curved. It may be shifted rotationally and/or in translation.

In order to enable the study of each part of the patient's breast, the beam 6 may be oriented in a multitude of directions D1 to D9 about the patient's breast. After having received the multitude of beams 6 which cross a part of the patient's body, the detector 3 emits electrical signals corresponding to the energy of the rays received. These electrical signals may then be transmitted to a control logic unit 10 by means of an external bus 11. These electrical signals enable this control logic unit 10 to produce an image corresponding to the part of the body analyzed. These images may be viewed by means of a screen of this control logic unit 10 or printed.

In one example, the control logic unit 10 comprises a microprocessor 12, a program memory 13, a data memory 14, a viewing screen 15 provided with a keyboard 16 and an output/input interface 17. The microprocessor 12, the program memory 13, the data memory 14, the viewing screen 15 provided with a keyboard 16 and the input/output interface 17 are interconnected by an internal bus 18.

In practice, when an action is attributed to a device, this action is performed by a microprocessor of the device controlled by instruction codes recorded in a program memory of the device. The control logic unit 10 is such a device. The control logic unit 10 is often made in integrated-circuit form.

The program memory 13 is divided into several zones, each zone corresponding to instruction codes in order to fulfill a function of the device. Depending on variants of the invention, the memory 13 has a zone 19 having instruction codes to set up a path of the tube 3 and to control a multiplicity of projections along this path. The memory 13 has a zone 20 having instruction codes to carry out a pre-processing of the projected images in order to correct artifacts due to the acquisition geometry and the detector.

The memory 13 has a zone 21 comprising instruction codes to apply a tomography reconstruction algorithm to all the projection images acquired at different angles, in order to obtain a reconstructed digital volume comprising 50 to 80 slices for an average breast.

The memory 13 has a zone 22 comprising instruction codes to apply a radiology sign detection algorithm. This radiology sign detection algorithm may be any present-day or future type of radiology sign detection algorithm. The radiology sign may be a microcalcification and/or a cluster of microcalcifications and/or a spiculated opacity. The memory 13 has a zone 23 comprising instruction codes to execute a surface computation algorithm bounding all the radiology sign voxels. This bounding surface is the maximum surface that can be occupied by the radiology sign in the volume.

The memory 13 has a zone 24 comprising instruction codes to determine each bounding surface, the set of successive reconstructed slices comprising the extent of the information on said surface. In other words, for each bounding surface, the instruction codes of the zone 24 determine the set of slices having a non-null intersection with said bounding surface. The memory 13 has a zone 25 comprising instruction codes to plot a 2D contour around the information on each intersection between a surface and a slice. The memory 13 has a zone 26 comprising instruction codes to create a symbolic marker at each contour representing the centre of gravity of said contour. This symbolic marker is a graphic annotation.

The memory 13 has a zone 27 comprising instruction codes to apply a transparency constraint algorithm to prevent the bounding surfaces from concealing information on corresponding radiology signs. The memory 13 has a zone 28 comprising instruction codes to obtain a slice-by-slice, looped or cine-looped viewing of the digital volume on the viewing screen 15. The memory 13 has a zone 29 comprising instruction codes to apply a 3D viewing algorithm to the digital volume.

In operating mode, the control logic unit then carries out a sampling of a series of exposures of the tube 3. The breast and therefore the detector are thus irradiated during consecutive exposures. For these exposures, the focus of the X-ray tube occupies positions in space which may be angularly distributed, fixed positions. In one example, and although this cannot be considered to be a restriction of the invention, it is planned that the angular exploration would thus be 60 degrees, plus or minus 30 degrees, relative to a central direction of irradiation, which is generally vertical to the detector for a mammography machine.

During this exploration, a certain number of beams 6 is emitted, for example 9, 11, 13, 15 or other numbers of beams depending on the desired precision. In the example of FIG. 1, the number of beams D1 to D9 is 9. All the beams 6 are acquired in a single scan. Each beam 6 represents a radiography projection.

Figure 2:
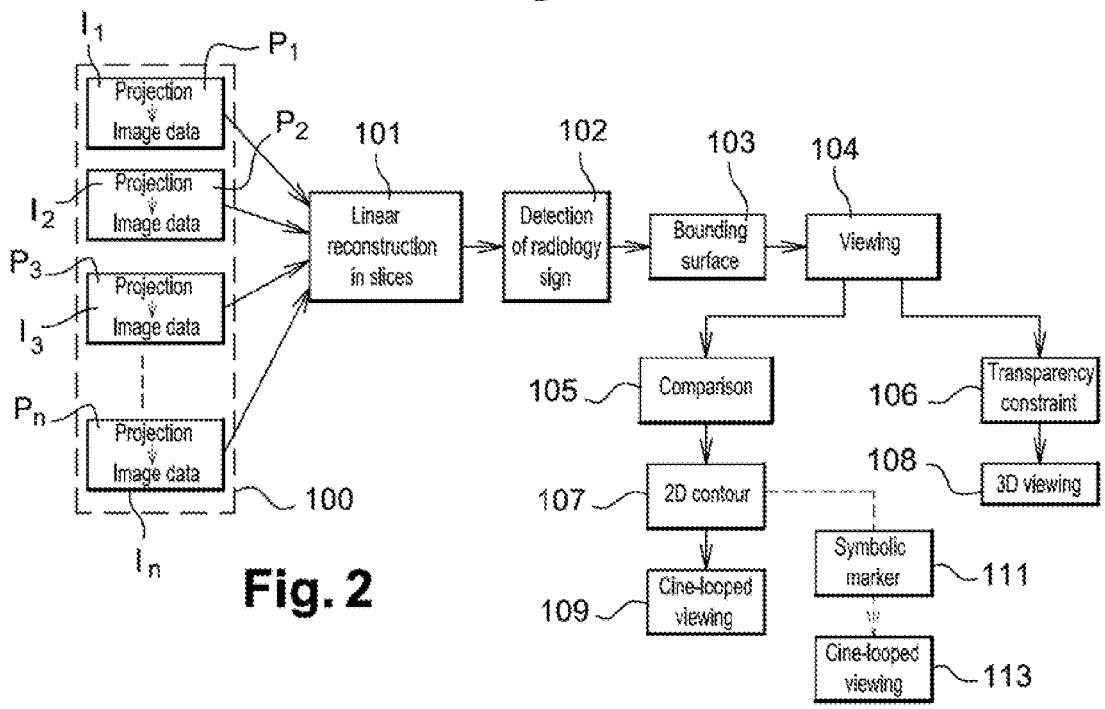
FIG. 2 is an illustration of means implementing the method of the invention.

FIG. 2 illustrates means implementing the viewing method of the invention, making it possible to dynamically reveal the voxels that could constitute radiology signs in the volume of the reconstructed breast. In the example of FIG. 2, the X-ray tube 3, in the step 100, emits X-ray intensities going through the patient's breast for a multiplicity of projections P1 to Pn, along a pre-determined path. The detector 4 acquires the X-ray image data I1 to In respectively representing the projections P1 to Pn. The control logic unit processes each of the X-ray images I1 to In.

At the step 101, the control logic unit applies a reconstruction algorithm called a simple back-projection reconstruction algorithm. This algorithm is used to rebuild or reconstruct the volume in different slice planes parallel to the detector. The term used here is breast tomosynthesis. All the images I1 to In are used during this tomosynthesis reconstruction to provide a digital volume of the breast. This tomosynthesis technique enables the 3D volume of the breast under study to be reconstructed from a small number of 2D projections or pieces of image data, distributed over a limited angular domain and acquired on a digital detector.

At the step 102, the control logic unit applies a radiology sign detection algorithm to the reconstructed volume in order to highlight the voxels likely to be radiology signs.

At the step 103, the control logic unit applies a bounding surface computation algorithm to each radiology sign detected at the step 102. This bounding surface is a 3D marker of radiology signs viewed by the practitioner. The bounding surface demarcates the maximum extent that make be occupied by a radiology sign detected in the digital volume. This surface defines a volume of interest (VOI), i.e. the zone of the volume comprising the radiology sign. The bounding surface may be computed by different modes of computation.

In a first mode of computation, the control logic unit computes the bounding surface from the extreme positions of the voxels constituting the radiology sign. To this end, for each radiology sign, the control logic unit computes the positions of each of the voxels along the axes X, Y and Z of the digital volume. For each axis X, Y or Z, from among all the positions computed, the control logic unit determines those voxels that have a minimum position and a maximum position. The control logic unit thus determines the parameters Xmin, Xmax, Ymin, Ymax and Zmin, Zmax indicating the minimum and maximum positions of the radiology sign along the axes X, Y and Z. These positions are used to demarcate the extent of the bounding surface which in this case is parallelepiped-shaped.

In a second mode of computation, the control logic unit determines the bounding surface in making a mathematical model of a predefined parametrical surface that describes the shape of a given type of radiology sign correspond with each type of radiology sign detected.

The parametrical surface is modeled by a mathematical model having several parameters. This parametrical surface is a series of equations for a given surface expressed in the form of parameters which position the points on the surface. This predefined parametrical surface is determined for each type of radiology sign. In a preferred example, the parametrical surface is ellipsoid when the type of radiology sign is a cluster of microcalcifications. It is spherical when the type of radiology sign is an opacity. And it is conical when the type of radiology sign is a spiculated opacity or a spicula.

For each radiology sign detected in the volume, the control logic unit applies an algorithm for the analysis of the main component. This algorithm is used to determine the distribution, in the volume, of the voxels of said radiology sign in order to compute especially parameters of shape and size of the radiology sign. Other types of algorithms may be used to compute these parameters of the detected radiology signs.

The shape and size parameters make it possible to obtain the best possible correspondence between the detected radiology sign and the predefined parametric surface. To this end, for each radiology sign detected, the control logic unit obtains concordance between the computed parameters of said radiology sign and the parameters of the surface predefined for this type of radiology sign.

This concordance or correspondence of these parameters enables the control logic unit to define the parameter surface best adapted to the radiological sign detected.

The bounding surface obtained by the correspondence gives information on the shape of the radiology sign in addition to the size and position of the radiology sign in the volume.

In the third mode of computation, the control logic unit computes the bounding surface in determining an active surface. To this end, the control logic unit first of all applies one of the above-mentioned two modes of computing the bounding surface. Then, the control logic unit applies constraint parameters pertaining to the shape and size of the radiology sign to the computed bounding surface in order to obtain an active bounding surface. The constraint parameters defined by the control logic unit are capable of changing the shape of the computed bounding surface in order to adapt it to the corresponding radiology sign.

For example, the control logic unit may define a constraint parameter for the size of radiology sign capable of improving the quality of the adjustment of the computed bounding surfaces to the corresponding radiology sign. This radiology sign shape constraint parameter is thus aimed at stretching the computed bounding surface to the edges of the detected radiology sign. The control logic unit may define a radiology sign shape constraint parameter capable of improving the contour of the computed bounding surface. This radiology sign shape constraint parameter is thus aimed at maintaining an overall shape of the radiology sign.

At the step 104, the control logic unit applies the viewing algorithm to the digital volume. This viewing algorithm is defined according to the dimensions of the marker. If the markers are 2D or 1D markers, the control logic unit applies the viewing algorithm illustrated in the steps 105, 107, 109, 111 and 113. This viewing algorithm enables a slice-by-slice display of the digital volume. If the markers are 3D markers, the control logic unit applies the viewing algorithm illustrated in the steps 106 and 108. This viewing algorithm enables an overall display of the digital volume.

At the step 105, for each bounding surface, the control logic unit determines the set of successive slices having a non-null intersection with said surface. At the step 107, for each intersection, the control logic unit plots a 2D contour around the data of this intersection. This 2D contour is a 2D marker viewed by the practitioner. This 2D contour may be a graphic annotation. In a preferred embodiment, the 2D contour is a geometrical shape determined as a function of the geometrical shape of the corresponding bounding surface.

At the step 109, the control logic unit achieves a slice-by-slice viewing of the digital volume. The control logic unit achieves this viewing by using a looped or cine-looped display mode of the slices of the digital volume. This looped display mode enables the display on the viewing screen of a sequence of slices of the digital volume in rapid succession, giving the illusion of motion on the part of the 2D contours.

This looped display mode may be implemented as a cine-looped display mode.

The control logic unit associates a condition of display of the 2D or 1D markers on the cine-looped display mode. This condition is as follows: a 2D contour remains displayed in the corresponding slice so long as the intersection of the corresponding slice with the corresponding bounding surface is non-null.

Hence, with the cine-looped display mode, the practitioner views a continuous display of the set of reconstructed slices with an appearance or disappearance of the 2D contours, giving them an effect of motion in the image, according to this condition of display.

In a preferred embodiment, for each bounding surface, the control logic unit determines a preferred slice from among all the successive slices having a non-null intersection with said surface. This preferred slice is the one for which the pieces of intersection data have a high confidence level. At this preferred slice, it is certain that there will be data on the detected radiology sign. In a preferred example, this preferred slice is the slice that cuts the number of successive slices having a non-null intersection with a bounding surface into two. This preferred slice may be the slice having an intersection with the bounding surface at the centroid of said bounding surface.

During the viewing, the control logic unit may increase the thickness of the lines of the 2D contour as and when the preferred slice is approached. Similarly, during the viewing, the control logic unit may reduce the thickness of the lines of the 2D contour as the distance from the preferred slice increases. In this case, the preferred slice is the one having the greatest thickness for the lines of the contour.

In one variant, the control logic unit may assign a color to the 2D contour of the preferred slice that is different from the colors of the other successive slices.

The increase in the thickness of the 2D contour of the preferred slice contour draws the practitioner's attention particularly to the preferred slice in which greater confidence is placed.

In one variant, at the step 111, the control logic unit creates a symbolic marker at each center of gravity of 2D contours obtained from the intersection of a bounding surface with slices parallel to the planes of the detector. These symbolic markers are graphic annotations. The symbolic marker is a 1D marker. It can be represented in the volume by the symbols * or Δ.

At the step 113, the control logic unit views the symbolic markers in applying the cine-looped display mode of the step 109. With the cine-looped display mode, the practitioner views a continuous display of the set of reconstructed slices, thus giving the effect of motion to the symbolic markers in the image.

At the step 106, the control logic unit displays the digital volume with the bounding surfaces. The bounding surfaces are viewed on the viewing screen with a constraint of transparency. This constraint of transparency prevents a given bounding surface from masking data pertaining to the corresponding radiology sign during the display of the volume. Indeed, since the bounding surfaces are opaque geometrical surfaces, they do not allow the practitioner to view their content.

In a preferred example, this constraint of transparency is achieved by the elimination of certain faces of the bounding surface. These faces to be eliminated are those perpendicular to the planes of the detector. Consequently, in viewing the digital volume perpendicularly to the center of the detector or at slightly different angles, the practitioner can see both the bounding surface and the data situated inside the bounding surface at the same time.

At the step 108, the control logic unit views the digital volume with an existing 3D viewing algorithm. Depending on the position and orientation of the practitioner in space, the control logic unit with the 3D viewing algorithm can determine the practitioner's viewpoint in the digital volume. This viewpoint is a 3D glimpse of a zone of the digital volume. The practitioner representing the camera for these algorithms views the volume at different angles in taking position around the volume.

The use of 1D, 2D or 3D markers when viewing the digital volume makes it possible to specify the position of the radiology signs in the volume and draw the practitioner's attention to the zones of clinical interest.

Figure 3:
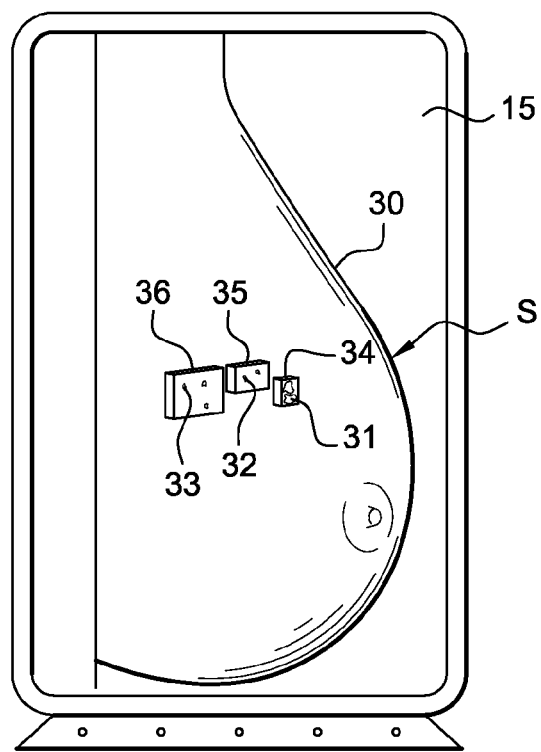
FIG. 3 shows a display of the digital volume of the breast on a viewing screen according to the invention.

FIG. 3 shows a display of the digital volume 30 of a patient's breast S on the viewing screen 15. In the volume 30, the control logic unit has detected three positions 31, 32 and 33 of three radiology signs. These radiology signs could be opacities and/or microcalcifications. At each position of a detected radiology sign, the control logic unit computes a surface bounding the set of voxels of said radiology sign. In the example of FIG. 3, the control logic unit applies the first bounding surface computing mode of the step 103 of FIG. 2. This bounding surface is parallelepiped-shaped.

Thus, for the positions 31, 32 and 33, the control logic unit respectively computes a parallelepiped-shaped bounding surface 34, 35 and 36.

In the example of FIG. 3, the control logic unit views the digital volume in applying the steps 106 and 108 of FIG. 2. The practitioner views the digital volume perpendicularly to the centre of the detector. To enable the display of the data situated inside the bounding surfaces 34, 35 and 36, for each bounding surface, the control logic unit eliminates the faces perpendicular to the centre of the detector. These faces to be eliminated are those situated in the direction in which the practitioner views the digital volume. In other words, the faces eliminated are the upper and lower faces of each parallelepiped-shaped bounding surface in the viewing direction. During the viewing, the practitioner's attention is automatically drawn to the bounding surfaces 34, 35 and 36 and their content.

Figure 4:
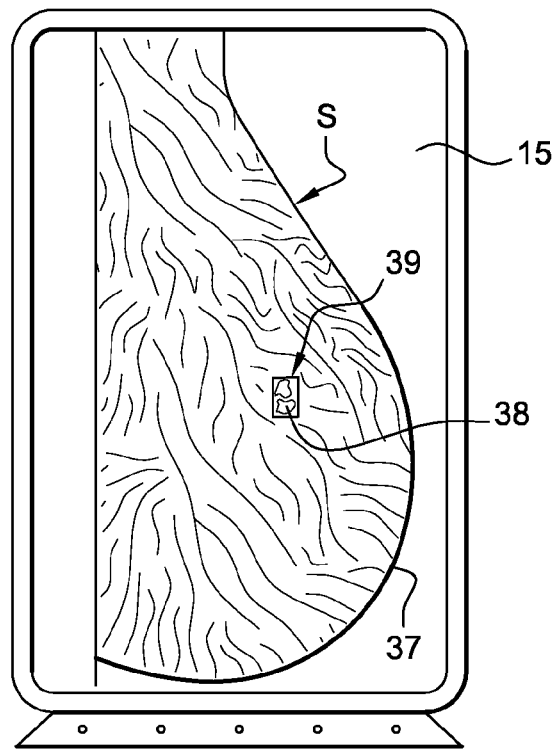
FIG. 4 shows the display of a slice of the digital volume of the breast on a viewing screen according to the invention.

FIG. 4 shows a view of a slice 37 of the digital volume of a patient's breast S on the viewing screen 15. The slice 37 has a non-null intersection 38 with the bounding surface 34.

This intersection 38 is a part of the information of the bounding surface 34 of a radiology sign of the volume. This intersection 38 represents the set of pixels of the slice 37 present at the intersection between the slice 37 and the bounding surface 34.

The control logic unit plots a 2D contour 39 about the intersection 38. This contour is rectangular because the bounding surface is parallelepiped-shaped. The 2D contour 39 remains displayed on the screen 15 so long as the intersection between the bounding surface and said slice is non-null.

As displayed on the screen 15, the slice 37 has no contour corresponding to an intersection with the bounding surfaces 35 and 36 of FIG. 3. This is due to the fact that the result of the intersection between this slice 37 and the bounding surface 35 and 36 is null.

What is claimed is:

1. A method for viewing mammography tomosynthesis images produced by an X-ray device, the method comprising:
    making several radiography projections of a body;
    reconstructing a digital volume of the body in slices;
    localizing structures representing radiology signs in the digital volume;
    computing for each localized radiology sign, a bounding surface corresponding to a surface demarcating a maximum extent of said radiology sign;
    determining for each bounding surface, a set of successive slices having a non-null intersection with said bounding surface;

plotting a 2D contour about each intersection, in a corresponding reconstructed slice; and one of:

continuously displaying the 2D contours of the slices of the digital volume in rapid succession on a screen for viewing; and applying a 3D viewing algorithm to the digital volume to produce the bounding surfaces.

2. A method according to claim 1, wherein the computing the bounding surface further comprises:

determining, for each radiology sign, a set of voxels that constitute it in the digital volume;

measuring minimum and maximum positions of the set of voxels along the X, Y and Z axes of the digital volume, for each radiology sign;

determining, for each radiology sign in each X, Y and Z axis, a lowest minimum position among the minimum positions measured and a highest maximum position among the maximum positions measured; and plotting the bounding surface for a given radiology sign as a function of the minimum and maximum positions of the voxels of said radiology sign, in each X, Y and Z axis.

3. A method according to claim 2, wherein the bounding surface is parallelepiped-shaped.

4. A method according to claim 1, wherein computing the bounding surface further comprises:

making a preliminary definition of a parametric surface for each type of radiology sign modeled by a mathematical model;

determining a distribution of voxels of each radiology sign detected in the digital volume, in order to determine especially size and shape parameters of said detected radiology sign; and making parameters of the predefined parametric surface corresponding to the parameters of the radiology sign, as a function of said radiology sign.

5. A method according to claim 4, wherein the parametric surface has one of the following shapes:

ellipsoid when the radiology sign is of the microcalcification cluster type, spherical when the radiology sign is of the opacity type, conical when the radiology sign is of the spiculated opacity type.

6. A method according to claim 4, wherein determining a distribution of the voxels of each radiology sign detected in the digital volume further comprises:

executing a main-component analysis algorithm.

7. A method according to claim 1, wherein computing the bounding surface further comprises:

determining the bounding surface;

defining a radiology-sign shape constraint parameter and a radiology-sign size constraint parameter; and applying these constraint parameters to the bounding surface.

8. A method according to claim 7, wherein the radiology-sign size constraint parameter is configured to stretch the bounding surface to the edges of the radiology sign, and the radiology-sign shape constraint parameter is configured to keep the shape of the radiology sign constant.

9. A method according to claim 1, further comprising:

creating, at the centre of gravity of each 2D contour, symbolic markers that are graphic annotations; and continuously displaying the symbolic markers with the slices of the digital volume in rapid succession on the screen for viewing.

10. A method according to claim 1, wherein the displaying of the 2D contours or of the symbolic markers further comprises:

for a 2D contour or a given marker, so long as the corresponding slice has a non-null intersection with the corresponding bounding surface, displaying said contour or said marker in the slice;

else, stopping the display of said 2D contour or said marker in the slice of the digital volume.

11. A method according to claim 1, wherein for each bounding surface, determining a preferred slice from among the set of successive slices having a non-null intersection with said bounding surface;

assigning a great thickness to the 2D contour of the preferred slice; and one of increasing and reducing the thickness of the 2D contours respectively as and when the preferred slice is approached or as and when the distance from the preferred slice increases, the preferred slice being the slice having the greatest thickness of the lines of the contour.

12. A method according to claim 11, wherein the preferred slice is the slice having an intersection with the bounding surface at the centroid of said bounding surface.

13. A method according to claim 11, wherein the preferred slice is the slice cutting the number of successive slices that have a non-null intersection with the bounding surface into two equal parts.

14. A method according to claim 11, further comprising:

assigning the 2D contour of the preferred slice a color different from the colors of the contours of the other successive slices.

15. A method according to claim 1, wherein the displaying of the bounding surfaces further comprises:

determining a constraint of transparency of the volume in order to prevent the bounding surfaces from masking voxels of the corresponding radiology sign; and displaying the bounding surfaces of the digital volume with the constraint of transparency.

16. A method according to claim 15, wherein the determining of the constraint of transparency further comprises:

eliminating faces of the bounding surfaces perpendicular to the plane of the detector.

* * * * *